(12) United States Patent
Tanei et al.

(10) Patent No.: US 11,454,542 B2
(45) Date of Patent: *Sep. 27, 2022

(54) SCALE COMPOSITION DETERMINATION SYSTEM, SCALE COMPOSITION DETERMINATION METHOD, AND PROGRAM

(71) Applicant: NIPPON STEEL CORPORATION, Tokyo (JP)

(72) Inventors: Hiroshi Tanei, Tokyo (JP); Masato Sugiura, Tokyo (JP); Shuichi Yamazaki, Tokyo (JP); Yasumitsu Kondo, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/243,875

(22) Filed: Apr. 29, 2021

(65) Prior Publication Data
US 2021/0247235 A1    Aug. 12, 2021

Related U.S. Application Data

(62) Division of application No. 16/499,812, filed as application No. PCT/JP2018/016868 on Apr. 25, 2018, now Pat. No. 11,029,212.

(51) Int. Cl.
*G01J 5/00* (2022.01)
*B21C 51/00* (2006.01)
*G01J 5/48* (2022.01)

(52) U.S. Cl.
CPC ............ *G01J 5/0003* (2013.01); *B21C 51/00* (2013.01); *G01J 5/0022* (2013.01); *G01J 5/485* (2022.01); *G01J 2005/0029* (2013.01)

(58) Field of Classification Search
None
See application file for complete search history.

(56) References Cited

U.S. PATENT DOCUMENTS 5,235,840 A   8/1993   Blazevic
5,314,249 A   5/1994   Marui et al.
(Continued)

FOREIGN PATENT DOCUMENTS

CN   104583739 A   4/2015
JP   7-270130 A    10/1995
(Continued)

OTHER PUBLICATIONS

"High Temperature Oxidation of Metals" compiled and translated by Yasutoshi Saito, Toru Atake, and Toshio Maruyama, Uchida Rokakuho Publishing Co., Ltd., 2013, pp. 32-34, total 5 pages.
Chen "Thermomechanical Phenomena During Rough Rolling of Steel Slab" The University of British Columbia, Nov. 1991, p. 1-214 (Year: 1991).
(Continued)

*Primary Examiner* — David P Porta
*Assistant Examiner* — Mamadou Faye
(74) *Attorney, Agent, or Firm* — Birch, Stewart, Kolasch & Birch, LLP

(57) ABSTRACT

A scale composition determination device (10) determines that $Fe_2O_3$ has been generated in the outermost layer of a scale (SC) in the case where the absolute value of a difference between temperatures of a steel material SM measured by radiation thermometers (20a, 20b) is equal to or more than a predetermined temperature, and determines that $Fe_2O_3$ has not been generated in the outermost layer of the scale (SC) in the case where the absolute value of the difference between the temperatures of the steel material SM measured by the radiation thermometers (20a, 20b) is not equal to or more than the predetermined temperature.

8 Claims, 7 Drawing Sheets

(56) References Cited

U.S. PATENT DOCUMENTS

| | | | |
|---|---|---|---|
| 8,726,692 B2 * | 5/2014 | Sudo | C03B 19/095 |
| | | | 65/17.3 |
| 2005/0063451 A1 | 3/2005 | Abe et al. | |
| 2015/0226610 A1 | 8/2015 | Uematsu et al. | |

FOREIGN PATENT DOCUMENTS

| | | |
|---|---|---|
| JP | 9-33464 A | 2/1997 |
| JP | 10-282020 A | 10/1998 |
| JP | 11-325839 A | 11/1999 |
| JP | 2008-233020 A | 10/2008 |
| JP | 2012-93177 A | 5/2012 |
| TW | 200305713 A | 11/2003 |

OTHER PUBLICATIONS

International Preliminary Report on Patentability and Written Opinion of the International Searching Authority (Forms PCT/IB/326, PCT/IB/373, PCT/ISA/237 and PCT/IB/326) for International Application No. PCT/JP2018/016868, dated Nov. 7, 2019, with an English translation of the Written Opinion.

International Search Report for PCT/JP2018/016868 dated Jul. 17, 2018.

Notice of Allowance dated Mar. 2, 2021 in copending U.S. Appl. No. 16/499,812.

Office Action dated Dec. 10, 2020 in copending U.S. Appl. No. 16/499,812.

Written Opinion of the International Searching Authority for PCT/JP2018/016868 (PCT/ISA/237) dated Jul. 17, 2018.

* cited by examiner

SCALE COMPOSITION DETERMINATION SYSTEM, SCALE COMPOSITION DETERMINATION METHOD, AND PROGRAM

CROSS REFERENCE TO RELATED APPLICATIONS

This application is a Divisional of copending application Ser. No. 16/499,812, filed on Sep. 30, 2019, which is the National Phase under 35 U.S.C. § 371 of International Application No. PCT/JP2018/016868, filed on Apr. 25, 2018, which claims the benefit under 35 U.S.C. § 119(a) to Patent Application No. 2017-086161, filed in Japan on Apr. 25, 2017, all of which are hereby expressly incorporated by reference, in their entirety, into the present application.

TECHNICAL FIELD

The present invention relates to a scale composition determination system, a scale composition determination method, and a program, and is suitably used for determining the composition of a scale generated on a surface of a steel material, in particular.

BACKGROUND ART

When a steel material is heated, a scale (layer of iron oxide) is generated on its surface. As for the scale generated on the surface of the steel material, there are a single-layer scale and a multilayer scale. The single-layer scale is a scale composed of only wustite (FeO). The multilayer scale is a scale composed of hematite ($Fe_2O_3$), magnetite ($Fe_3O_4$), and wustite (FeO). In the multilayer scale, hematite ($Fe_2O_3$), magnetite ($Fe_3O_4$), and wustite (FeO) are arranged in this order from a surface layer. As described in Patent Literature 1, the temperature of the steel material, the oxygen concentration in the ambient atmosphere of the steel material, or the like determines which of the single-layer scale or the multilayer scale a scale becomes. Further, the adhesiveness of a scale has something to do with its composition. For example, in a hot rolling process, the frequency of occurrence of exfoliation of a scale caused by blistering or the like increases dramatically when $Fe_2O_3$ is present in the outermost layer of the scale.

When the scale is exfoliated in the hot rolling process, there is a risk that the exfoliated scale is pressed into the steel material by rolling thereafter, and thereby a flaw is formed in the surface of the steel material. Further, even in the case where the exfoliated scale is not pressed into the steel material, there is a risk that a pattern of the scale is generated on the surface of the steel material after pickling. Accordingly, it is desired to determine the composition of the scale to utilize a determination result for operation.

As a method of determining the composition of a scale, X-ray diffraction measurement is considered. In the X-ray diffraction measurement, a test piece obtained by cutting a steel material with a growing scale thereon into a size of about several centimeters is fabricated and an X-ray diffraction pattern of this test piece is measured. X-ray diffraction patterns different according to a crystal structure of the scale are obtained. Thus, the X-ray diffraction pattern makes it possible to determine whether or not $Fe_2O_3$ is present in the outermost layer of the scale (namely, the scale is the previously described single-layer scale or multilayer scale).

However, the X-ray diffraction measurement requires fabrication of a test piece by cutting the steel material. Moreover, the X-ray diffraction pattern can be measured only after the steel material is cooled. Thus, it is impossible to determine the composition of a scale generated on the surface of the steel material during operation online (in real time).

Thus, the art described in Patent Literature 1 determines whether or not $Fe_2O_3$ is present in the outermost layer of a scale by determining which of a process of supplying oxygen molecules to an oxide film on the surface of a steel sheet or a process of iron atoms oxidizing on the surface of a steel material determines the rate of a rate-determining process of oxidation on the surface of the steel material.

CITATION LIST

Patent Literature

Patent Literature 1: Japanese Laid-open Patent Publication No. 2012-93177

Non Patent Literature

Non Patent Literature 1: "High Temperature Oxidation of Metals" compiled and translated by Yasutoshi Saito, Toru Atake, and Toshio Maruyama, UCHIDA ROKAKUHO PUBLISHING CO., LTD., p. 32 to p. 34, 2013

SUMMARY OF INVENTION

Technical Problem

However, the art described in Patent Literature 1 needs to use a model equation in order to determine the rate-determining process of oxidation on the surface of the steel material. Thus, the accuracy of determination relies on the accuracy of the model equation. Further, it is necessary to presume the thickness of an initial oxide layer. Furthermore, it is necessary to set a plurality of model constants in the model equation. Therefore, it is necessary to accurately determine the model constants. Accordingly, there is a problem that it is not easy to accurately determine the composition of a scale generated on the surface of the steel material during operation online (in real time).

The present invention has been made in consideration of the above problems, and an object thereof is to be capable of accurately determining the composition of a scale generated on the surface of a steel material during operation online.

Solution to Problem

A first example of the scale composition determination system of the present invention is a scale composition determination system that determines a composition of a scale generated on a surface of a steel material, the scale composition determination system including: a measurement means that measures temperatures of the steel material at two wavelengths different from each other by radiation thermometry; and a determination means that determines whether or not hematite ($Fe_2O_3$) has been generated in an outermost layer of the scale based on a difference between the temperatures of the steel material measured by the measurement means, in which a thickness of hematite at an intersection point of a hematite curve at, out of the two wavelengths, a first wavelength and a hematite curve at a second wavelength is determined so as to exceed an upper limit value of a thickness assumed as a thickness of hematite generated in the outermost layer of the scale, and the hematite curves are curves indicating the relationship between a thickness of hematite and a temperature of hematite.

A second example of the scale composition determination system of the present invention is a scale composition determination system that determines a composition of a scale generated on a surface of a steel material, the scale composition determination system including: a measurement means that measures temperatures of the steel material at N pieces of wavelengths different from one another by radiation thermometry; and a determination means that determines whether or not hematite ($Fe_2O_3$) has been generated in an outermost layer of the scale based on a difference between the two temperatures out of the temperatures of the steel material measured by the measurement means, in which N pieces of the wavelengths are determined so as to prevent an intersection point where hematite curves at N pieces of the wavelengths all intersect from being present within a range of an assumed thickness of hematite ($Fe_2O_3$), the hematite curves are curves indicating the relationship between a thickness of hematite and a temperature of hematite, and N is an integer of three or more.

A first example of the scale composition determination method of the present invention is a scale composition determination method that determines a composition of a scale generated on a surface of a steel material, the scale composition determination method including: a measurement step of measuring temperatures of the steel material at two wavelengths different from each other by radiation thermometry; and a determination step of determining whether or not hematite ($Fe_2O_3$) has been generated in an outermost layer of the scale based on a difference between the temperatures of the steel material measured by the measurement step, in which a thickness of hematite at an intersection point of a hematite curve at, out of the two wavelengths, a first wavelength and a hematite curve at a second wavelength is determined so as to exceed an upper limit value of a thickness assumed as a thickness of hematite generated in the outermost layer of the scale, and the hematite curves are curves indicating the relationship between a thickness of hematite and a temperature of hematite.

A second example of the scale composition determination method of the present invention is a scale composition determination method that determines a composition of a scale generated on a surface of a steel material, the scale composition determination method including: a measurement step of measuring temperatures of the steel material at N pieces of wavelengths different from one another by radiation thermometry; and a determination step of determining whether or not hematite ($Fe_2O_3$) has been generated in an outermost layer of the scale based on a difference between the two temperatures out of the temperatures of the steel material measured by the measurement step, in which N pieces of the wavelengths are determined so as to prevent an intersection point where hematite curves at N pieces of the wavelengths all intersect from being present within a range of an assumed thickness of hematite ($Fe_2O_3$), the hematite curves are curves indicating the relationship between a thickness of hematite and a temperature of hematite, and N is an integer of three or more.

A first example of the program of the present invention is a program for causing a computer to execute determination of a composition of a scale generated on a surface of a steel material, the program causing a computer to execute: an acquisition step of acquiring temperatures of the steel material at two wavelengths different from each other, the temperatures measured by radiation thermometry; and a determination step of determining whether or not hematite ($Fe_2O_3$) has been generated in an outermost layer of the scale based on a difference between the temperatures of the steel material acquired by the acquisition step, in which a thickness of hematite at an intersection point of a hematite curve at, out of the two wavelengths, a first wavelength and a hematite curve at a second wavelength is determined so as to exceed an upper limit value of a thickness assumed as a thickness of hematite generated in the outermost layer of the scale, and the hematite curves are curves indicating the relationship between a thickness of hematite and a temperature of hematite.

A second example of the program of the present invention is a program for causing a computer to execute determination of a composition of a scale generated on a surface of a steel material, the program causing a computer to execute: an acquisition step of acquiring temperatures of the steel material at N pieces of wavelengths different from one another, the temperatures measured by radiation thermometry; and a determination step of determining whether or not hematite ($Fe_2O_3$) has been generated in an outermost layer of the scale based on a difference between the two temperatures out of the temperatures of the steel material acquired by the acquisition step, in which N pieces of the wavelengths are determined so as to prevent an intersection point where hematite curves at N pieces of the wavelengths all intersect from being present within a range of an assumed thickness of hematite ($Fe_2O_3$), the hematite curves are curves indicating the relationship between a thickness of hematite and a temperature of hematite, and N is an integer of three or more.

DESCRIPTION OF EMBODIMENTS

Hereinafter, there will be explained embodiments of the present invention with reference to the drawings.

First Embodiment

First, there will be explained a first embodiment.
<Outline of a Configuration of a Hot Rolling Line>

Figure 1:
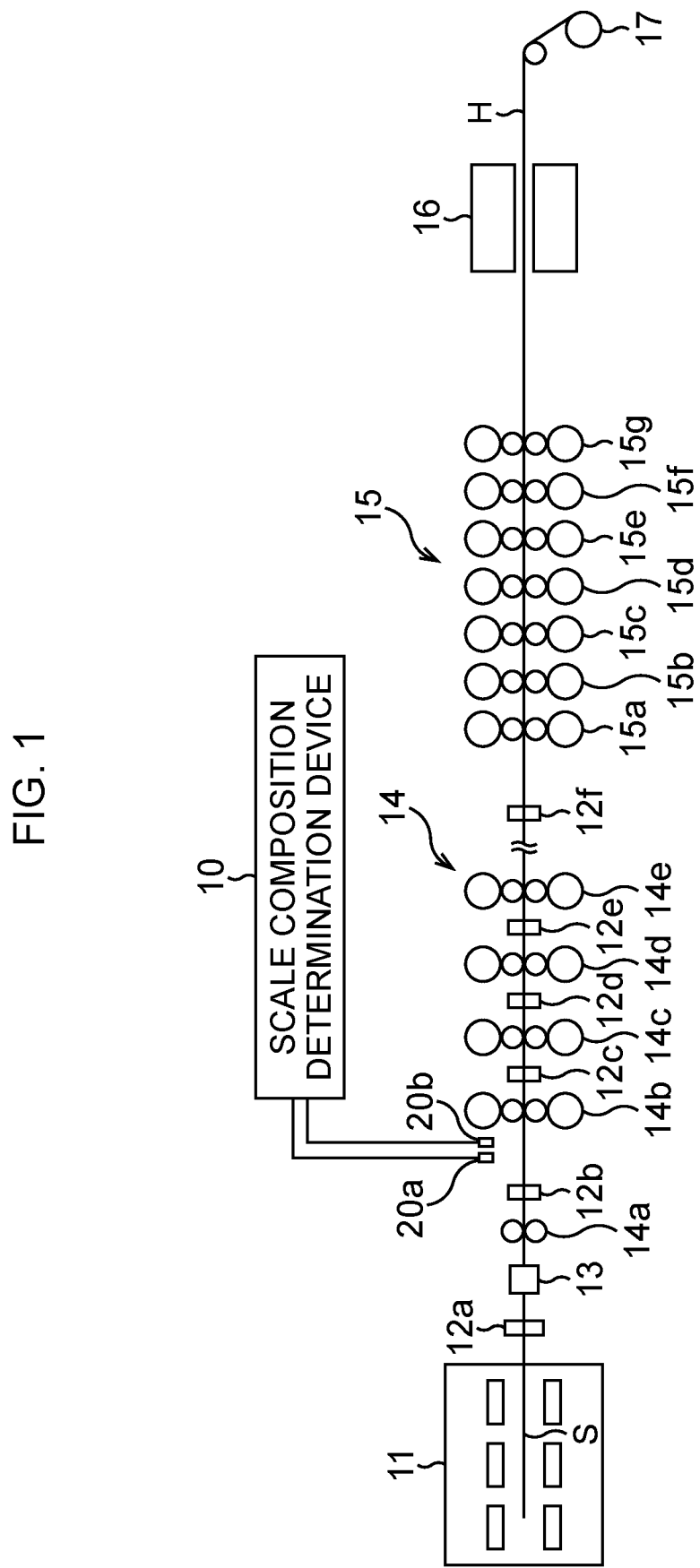
FIG. 1 is a view illustrating one example of a schematic configuration of a hot rolling line.

FIG. 1 is a view illustrating one example of a schematic configuration of a hot rolling line being one example of an application destination of a scale composition determination device 10.

In FIG. 1, the hot rolling line has a heating furnace 11, descalers 12a to 12f, a width-direction mill 13, a roughing mill 14, a finishing mill 15, a cooling device (run out table) 16, and a coiling device (coiler) 17.

The heating furnace 11 heats a slab (steel material) S.

The descalers 12a to 12f remove a scale generated on the surface of the steel material. The thickness of the scale is 10 [μm] to 100 [μm], for example. The descalers 12a to 12f spray, for example, pressurized water on the surface of the steel material, thereby performing descaling (removing the scale). Incidentally, the steel material is high in temperature, so that the steel material is immediately oxidized again even though the scale is removed. Thus, the steel material is rolled in a state where a scale is always present on the surface.

The width-direction mill 13 rolls the slab S heated in the heating furnace 11 in the width direction.

The roughing mill 14 vertically rolls the slab S rolled in the width direction by the width-direction mill 13 to make a rough bar. In the example illustrated in FIG. 1, the roughing mill 14 has a rolling stand 14a composed of only work rolls and rolling stands 14b to 14e having work rolls and backup rolls.

The finishing mill 15 further continuously hot finishing rolls the rough bar manufactured by the roughing mill 14 to a predetermined thickness. In the example illustrated in FIG. 1, the finishing mill 15 has seven rolling stands 15a to 15g.

The cooling device 16 cools a hot-rolled steel sheet H hot finishing rolled by the finishing mill 15 by cooling water.

The coiling device 17 coils the hot-rolled steel sheet H cooled by the cooling device 16 into a coil shape.

Incidentally, the hot rolling line can be fabricated by a well-known art and is not limited to the configuration illustrated in FIG. 1. The descaler may be arranged between the upstream rolling stands (for example, between the rolling stands 15a and 15b and between the rolling stands 15b and 15c) out of the seven rolling stands 15a to 15g of the finishing mill 15, for example.

In this embodiment, at least one set of radiation thermometers, which is one set composed of two radiation thermometers, is arranged in the hot rolling line. The radiation thermometers measure the temperature of the steel material in a non-contact manner by radiation thermometry.

In the example illustrated in FIG. 1, the case where a set of radiation thermometers 20a, 20b is arranged in a region between the descaler 12b and the rolling stand 14b is illustrated. The rolling stand 14b is a rolling stand provided on the most upstream side out of the rolling stands having work rolls and backup rolls.

Figure 2:
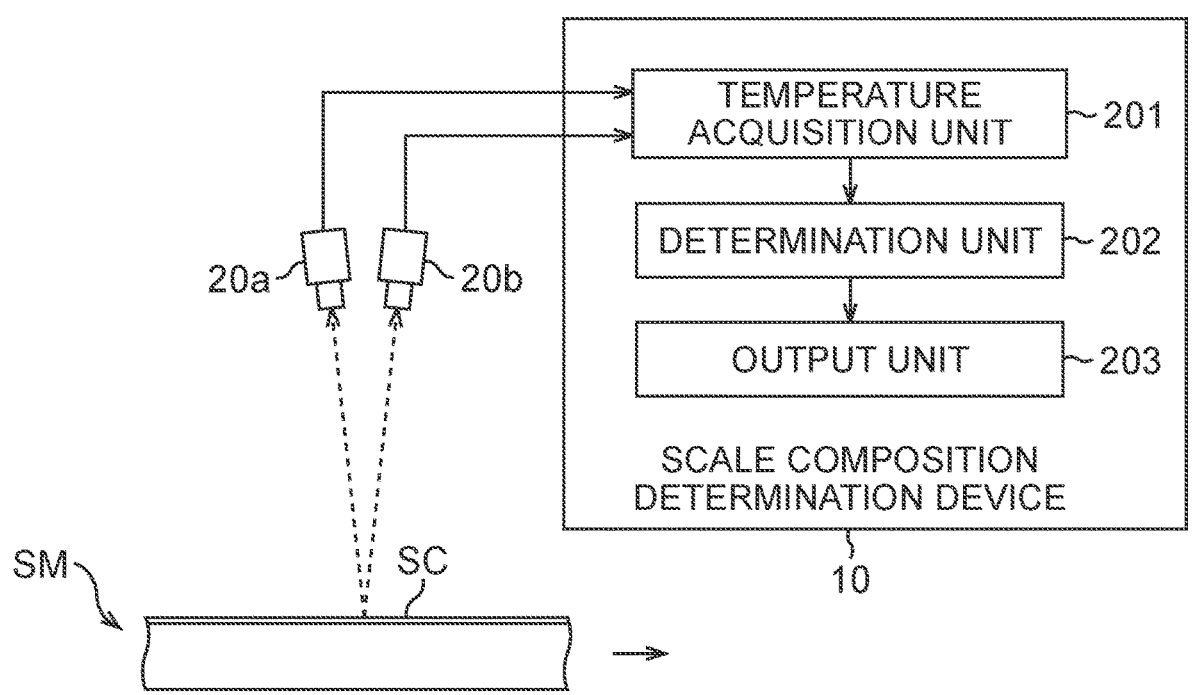
FIG. 2 is a view illustrating a first example of a configuration of a scale composition determination system.

The scale composition determination device 10 illustrated in FIG. 2 inputs the temperatures of a steel material SM measured by the radiation thermometers 20a, 20b. The scale composition determination device 10 determines which of a single-layer scale or a multilayer scale has been generated on the surface of the steel material SM as a scale SC based on the input temperatures of the steel material SM. As described previously, the single-layer scale is a scale composed of only FeO. The multilayer scale is a scale composed of hematite ($Fe_2O_3$), magnetite ($Fe_3O_4$), and wustite (FeO).

In the multilayer scale, hematite ($Fe_2O_3$), magnetite ($Fe_3O_4$), and wustite (FeO) are arranged in this order from a surface layer.

FIG. 2 is a view illustrating one example of a configuration of a scale composition determination system. In FIG. 2, examples of the arrangement of the radiation thermometers 20a, 20b and a functional configuration of the scale composition determination device 10 are illustrated.

<Radiation Thermometers 20a, 20b>

First, there will be explained one example of the arrangement of the radiation thermometers 20a, 20b. In FIG. 2, the case where the direction of an arrow line attached beside the steel material SM is the conveying direction of the steel material SM is illustrated as an example. Further, it is set that the scale SC is generated on the surface of the steel material SM.

In FIG. 2, the radiation thermometers 20a, 20b are arranged so that intersection points between (the surface of) the steel material SM and passing positions of axes of the radiation thermometers 20a, 20b (optical axes of light collecting lenses) substantially coincide. Incidentally, in FIG. 2, the case where the radiation thermometers 20a, 20b are aligned in the conveying direction of the steel material SM is illustrated as an example. However, the radiation thermometers 20a, 20b do not need to be arranged in this manner as long as the intersection points between (the surface of) the steel material SM and the passing positions of the axes of the radiation thermometers 20a, 20b (the optical axes of the light collecting lenses) substantially coincide. For example, the radiation thermometers 20a, 20b may be aligned in the width direction of the steel material SM.

Then, there will be explained one example of a wavelength to be detected in the radiation thermometers 20a, 20b.

In a region (atmosphere) between the radiation thermometers 20a, 20b and the steel material SM, water vapor ($H_2O$) and gas such as carbon dioxide ($CO_2$) are present. Light (infrared radiation) emitted from the scale SC has a wavelength band absorbed by this gas.

The present inventors examined the relationship between the presence or absence of attenuation of emitted light in a light path from an object to be measured to a radiation thermometer and a wavelength $\lambda$ detected by this radiation thermometer under the environment of the hot rolling process. As a result, the present inventors confirmed that if the wavelength $\lambda$ to be detected by the radiation thermometers 20a, 20b is selected from one of the following wavelength bands of (a1) to (c1), the radiation thermometers 20a, 20b can measure spectral radiance without greatly being affected by the gas in the atmosphere. That is, the wavelength $\lambda$ to be detected by the radiation thermometers 20a, 20b is selected from within the wavelength bands of (a1) 0.6 [μm] to 1.6 [μm], (b1) 3.3 [μm] to 5.0 [μm], and (c1) 8.0 [μm] to 14.0 [μm]. Doing this enables the radiation thermometers 20a, 20b to measure the spectral radiance without greatly being affected by the gas in the atmosphere. Incidentally, the spectral radiance is a radiant flux [$W \cdot \mu m^{-1} \cdot sr^{-1} \cdot m^{-2}$] per unit wavelength, per unit area, and per unit solid angle at the wavelength $\lambda$ [μm]. Further, the wavelengths A to be detected by the radiation thermometers 20a, 20b respectively are set to be selected from the wavelength bands different from each other. In the case where the wavelength $\lambda$ to be measured by the radiation thermometer 20a is selected from the wavelength band of (a1), for example, the wavelength $\lambda$ to be measured by the radiation thermometer 20b is selected from either (b1) or (c1).

Here, the lower limit value of (a1) described previously is determined by the lower limit value of the wavelength $\lambda$ at which the radiation thermometer can measure the spectral radiance (the lower limit value of the temperature of the steel material SM being an object to be measured). The lower limit value of the wavelength λ that enables measurement of the spectral radiance is determined according to the temperature of the steel material SM being an object to be measured. When measuring the temperature equal to or more than 900[° C.] as the temperature of the steel material SM being an object to be measured, for example, the lower limit value of the wavelength λ at which the radiation thermometer can measure the spectral radiance results in 0.6 [μm]. Thus, the lower limit value of (a1) is set to 0.6 [μm] here. Incidentally, when the lower limit value of the temperature of the steel material SM being an object to be measured is set to 600[° C.], the lower limit value of (a1) described previously results in 0.9 [μm]. Further, the upper limit value of (c1) is determined by limiting performance of an optical detector in the radiation thermometer (detection performance of long-wavelength infrared radiation).

Then, the present inventors conducted the following examination in terms of the wavelengths λ belonging to the previously described wavelength bands of (a1) to (c1).

Figure 3:
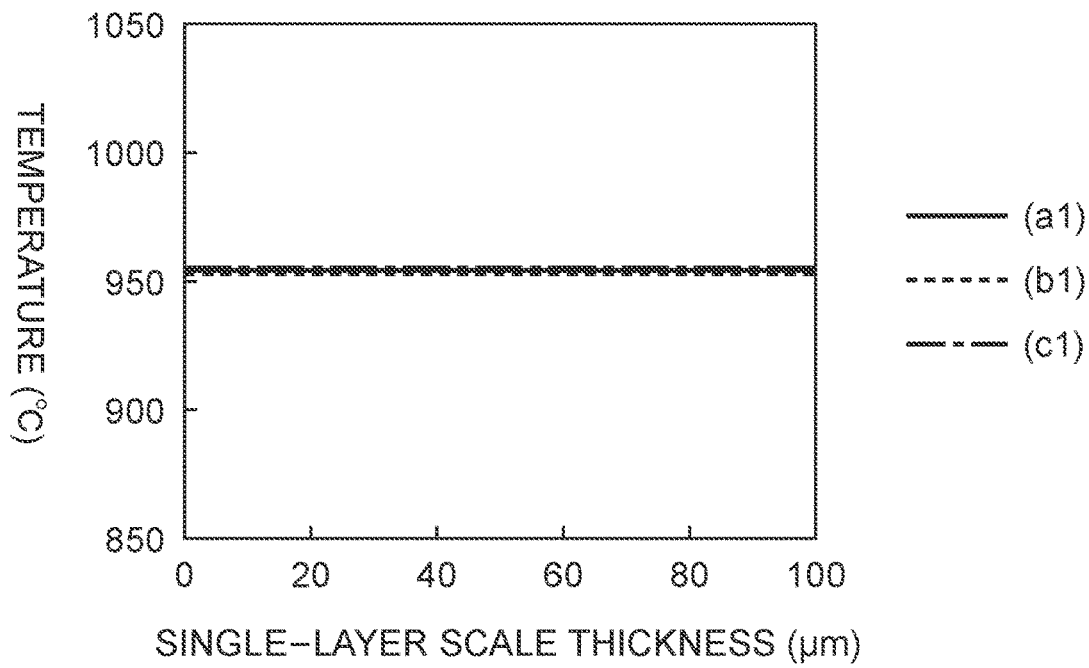
FIG. 3 is a view illustrating one example of the relationship between a temperature of a steel material and a thickness of a single-layer scale.

FIG. 3 is a view illustrating one example of the relationship between a measured value of the temperature of the steel material SM and a thickness of the single-layer scale. As illustrated in FIG. 3, the examination is conducted by taking the steel material SM at the temperature of 900[° C.] as an example here.

As illustrated in FIG. 3, it is found out that spectral emissivity $\varepsilon_w$ of FeO according to the wavelength λ is set in the radiation thermometer, and thereby as the temperature of the single-layer scale (FeO), a fixed temperature regardless of the thickness of the single-layer scale (FeO) is measured by the radiation thermometer as a measured value. Further, it is found out that regardless of the wavelength λ, the temperature of the same value is measured by the radiation thermometer as the temperature of the single-layer scale (FeO). This is because FeO is opaque and the spectral emissivity does not vary according to the thickness. Incidentally, the spectral emissivity $\varepsilon_w$ of FeO can be measured experimentally or found by referring to an optical constant database.

Further, the present inventors examined the relationship between the temperature of the steel material SM having a multilayer scale on the surface and a thickness of $Fe_2O_3$ in the outermost layer of this multilayer scale in terms of each of the wavelengths λ belonging to the respective wavelength bands of (a1), (b1), and (c1). As described previously, the wavelength λ is a wavelength to be detected by the radiation thermometer.

Figure 4:
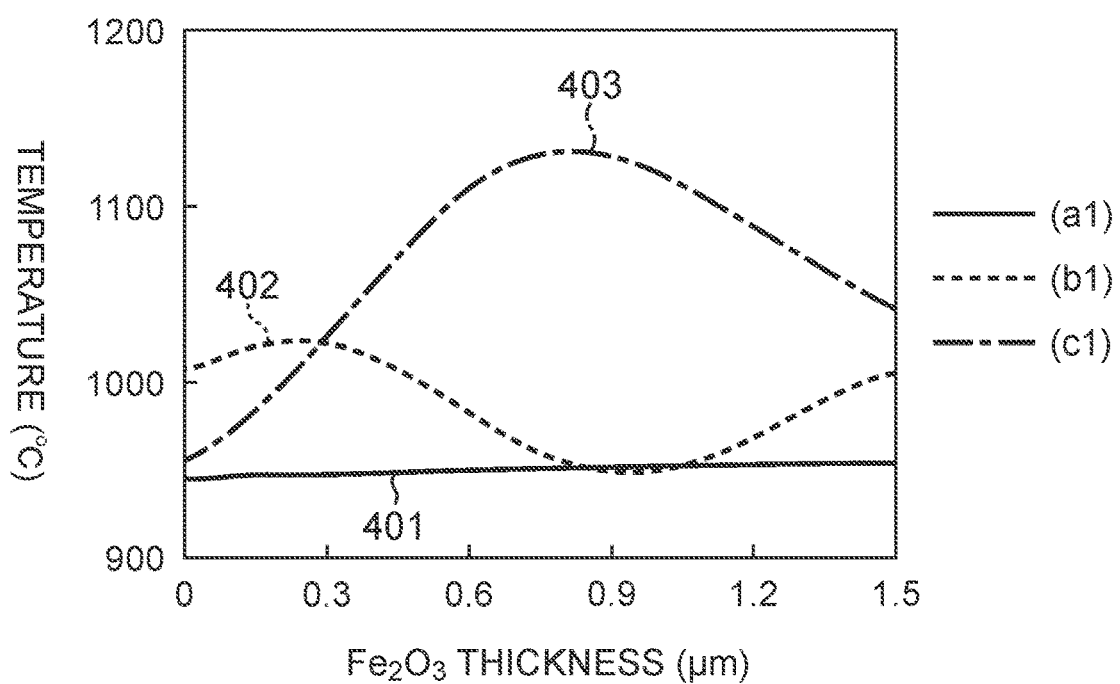
FIG. 4 is a view illustrating one example of the relationship between a temperature of the steel material and a thickness of $Fe_2O_3$ in the outermost layer of a multilayer scale.

There is illustrated one example of the relationship between a measured value of the temperature of the steel material SM having a multilayer scale on the surface and a thickness of $Fe_2O_3$ in the outermost layer of this multilayer scale at each of the wavelengths λ in FIG. 4. As described previously, $Fe_2O_3$ is present in the outermost layer of the multilayer scale. In FIG. 4, the $Fe_2O_3$ thickness indicates the thickness of $Fe_2O_3$ in the outermost layer of the multilayer scale. Further, when deriving the temperature of the steel material at each of the wavelengths λ, the previously described spectral emissivity $\varepsilon_w$ of FeO at the corresponding wavelength λ was used.

In FIG. 4, curves 401, 402, and 403 indicate the relationship between a measured value of the temperature of the steel material SM and a $Fe_2O_3$ thickness (a thickness of $Fe_2O_3$ in the outermost layer of the multilayer scale) in the case where the wavelengths λ belong to the wavelength bands of (a1), (b1), and (c1) respectively. In this embodiment, the curve indicating the relationship between a measured value of the temperature of the steel material SM and hematite (a $Fe_2O_3$ thickness) at each of the wavelengths λ in this manner is referred to as a "hematite curve" as necessary.

As illustrated in FIG. 4, the measured value of the temperature of the steel material SM having the multilayer scale on the surface, which is obtained by the radiation thermometer, varies according to the thickness of $Fe_2O_3$. This is conceivably because the spectral emissivity of $Fe_2O_3$ varies according to the thickness of $Fe_2O_3$ due to an effect of interference of light by $Fe_2O_3$ and further a wavelength of the spectral emissivity (a waveform indicating the relationship between the spectral emissivity and the thickness of $Fe_2O_3$) also varies according to the wavelength λ. Incidentally, a phenomenon itself, in which due to the effect of interference of light by $Fe_2O_3$, the spectral emissivity of $Fe_2O_3$ varies according to the thickness of $Fe_2O_3$, is described in Patent Literature 1. In this embodiment, new findings that the variation in spectral emissivity according to the thickness of $Fe_2O_3$ varies according to a wavelength are utilized.

The result illustrated in FIG. 4 reveals that the hematite curves 401, 402, and 403 all do not intersect at one point in the case where the thickness of $Fe_2O_3$ is at least 1.5 [μm] or less. Therefore, when the thickness of $Fe_2O_3$ is at least 1.5 [μm] or less, at least one set of the two curves not intersecting with each other, which is a set of the two curves out of the hematite curves 401, 402, and 403, is present. FIG. 4 reveals (a2) to (c2) below concretely.

(a2) In the case of the thickness of $Fe_2O_3$ being 1.5 [μm] or less, the hematite curve 401 and the hematite curve 403 do not intersect.

(b2) In the case of the thickness of $Fe_2O_3$ being less than 0.86 [μm], the hematite curve 401 and the hematite curve 402 do not intersect, and the hematite curve 401 and the hematite curve 403 do not intersect.

(c2) In the case of the thickness of $Fe_2O_3$ being less than 0.29 [μm], the hematite curves 401 to 403 all do not intersect.

Incidentally, the thickness of $Fe_2O_3$ generated in the outermost layer of the scale SC is found as follows. First, by using the temperature of the steel material SM when the scale is removed by descaling and an elapsed time thereafter, the thickness of the entire scale SC is found from a well-known scale thickness equation. The scale thickness equation is an equation to find the entire thickness of the scale SC from a function of temperature and time. Then, as the thickness of $Fe_2O_3$ assumed to be generated in the hot rolling line, the thickness of 1[%] of the entire thickness of the scale SC is found. In this embodiment, the case where the thickness of $Fe_2O_3$ is estimated in this manner will be explained as an example. In the following explanation, the thickness of $Fe_2O_3$ to be estimated in this manner is referred to as an estimated thickness of $Fe_2O_3$ as necessary. Incidentally, the estimated thickness of $Fe_2O_3$ may be found by performing a laboratory experiment of scale generation assuming actual temperature history. In the range of the temperature of the steel material SM assumed in this embodiment (600[° C.] to 120[° C.]), the estimated thickness of $Fe_2O_3$ generated in the outermost layer of the scale SC is up to 0.50 [μm]. As for the steel material SM passing through the finishing mill 15, the thickness of $Fe_2O_3$ generated in the outermost layer of the scale SC is up to 0.18 [μm].

In the range of the temperature of the steel material SM assumed in this embodiment (600[° C.] to 120[° C.]), (a2) to (c2) indicating the "relationship between the estimated thickness of $Fe_2O_3$ and the combination of the two hematite curves not intersecting with each other" above are applied also to the other combinations of the wavelengths in the previously described wavelength bands of (a1) to (c1). However, in the other combinations of the wavelengths, the intersection points of the hematite curves 401, 402, and 403 are different from those illustrated and described in FIG. 4 and (a2) to (c2) described above as an example.

For example, the upper limit of the estimated thickness of $Fe_2O_3$ in the explanation of (a2) described previously is calculated from the intersection point between a hematite curve found from the wavelength λ selected from within the wavelength band of (a1) (first hematite curve) and a hematite curve found from the wavelength λ selected from within the wavelength band of (a2) (second hematite curve).

Then, between 1.5 [μm] being the estimated thickness of $Fe_2O_3$ and the thickness calculated from the intersection point between the first hematite curve and the second hematite curve, the larger thickness is set to a first thickness and the smallest thickness is set to a second thickness.

In the case where there is a difference between the first thickness and the second thickness, the second thickness being the smaller thickness is employed as the upper limit of the case where the "hematite curve 401 and the hematite curve 403 do not intersect" of (a2).

Similarly, the upper limit in a region where the "hematite curve 401 and the hematite curve 402 do not intersect and the hematite curve 401 and the hematite curve 403 do not intersect" of (b2) (0.86 [μm] in the example illustrated in FIG. 4) is also employed by calculating the hematite curves 401 to 403 according to the selected wavelength λ.

The upper limit in a region where the "hematite curves 401 to 403 do not all intersect" of (c2) (0.29 [μ m] in the example illustrated in FIG. 4) also only needs to be determined from the intersection point between the hematite curve 402 and the hematite curve 403 in the same manner. Incidentally, as described previously, in this embodiment, it is assumed that the steel material SM having a temperature falling within a range of 600[° C.] to 1200[° C.] is conveyed in the hot rolling line. In such a temperature range, the thickness of $Fe_2O_3$ to be employed in place of 1.5 [μm] being the upper limit in (a2) does not differ greatly from 1.5 [μm]. The thicknesses of $Fe_2O_3$ in the explanations of (b2) to (c2) also do not differ greatly from the upper limit and the lower limit illustrated in FIG. 4 similarly.

From the above, (a3) to (c3) below can be said.

(a3) In the case where the estimated thickness of $Fe_2O_3$ is less than 1.5 [μm] (or the second thickness of $Fe_2O_3$, which is smaller than 1.5 [μm] as described previously), each one wavelength λ is selected from within the previously described wavelength bands of (a1) and (c1). This makes it possible to determine that $Fe_2O_3$ is present in the outermost layer of the scale SC in the case where there is a difference between the first temperature and the second temperature that are measured by the radiation thermometers 20a, 20b at these wavelengths λ, and it is possible to determine that $Fe_2O_3$ is not present because FeO is present in the outermost layer in the case where there is no difference between the first temperature and the second temperature as illustrated in FIG. 3.

(b3) In the case where the estimated thickness of $Fe_2O_3$ is less than 0.86 [μm] (or the thickness of $Fe_2O_3$ to be employed in place of 0.86 [μm] as described previously), there is employed one of selecting each one wavelength λ from within the previously described wavelength bands of (a1) and (c1) and selecting each one wavelength λ from within the previously described wavelength bands of (a1) and (b1). This makes it possible to determine that $Fe_2O_3$ is present in the outermost layer of the scale SC in the case where there is a difference between the temperatures measured by the radiation thermometers 20a, 20b at these wavelengths λ and determine that $Fe_2O_3$ is not present in the case where there is no difference therebetween.

(c3) In the case where the estimated thickness of $Fe_2O_3$ is less than 0.29 [μm] (or the thickness of $Fe_2O_3$ to be employed in place of 0.29 [μm] as described previously), each one wavelength X is selected from within any two out of the previously described wavelength bands of (a1) to (c1). This makes it possible to determine that $Fe_2O_3$ is present in the outermost layer of the scale SC in the case where there is a difference between the temperatures measured by the radiation thermometers 20a, 20b at these wavelengths λ, and determine that $Fe_2O_3$ is not present in the case where there is no difference therebetween.

As above, according to the upper limit value of the estimated thickness of $Fe_2O_3$ to be an object to be determined (the second thickness), two wavelength bands are selected from the previously described wavelength bands of (a1) to (c1). Here, the upper limit value of the estimated thickness of $Fe_2O_3$ to be an object to be determined is the maximum value of a thickness assumed as the estimated thickness of $Fe_2O_3$ in the outermost layer of the scale SC generated on the surface of the steel material SM that is subjected to hot rolling in the hot rolling line. Then, the wavelengths λ different from each other that are selected one by one from within the two wavelength bands respectively selected from the wavelength bands of (a1) to (c1) (a first wavelength λ and a second wavelength λ) are set to wavelengths being an object for measurement. The radiation thermometers 20a, 20b are used for the measurements at these wavelengths respectively. Then, spectral emissivities of FeO at the selected wavelengths λ are set in the radiation thermometers 20a, 20b. In this manner, the radiation thermometers 20a, 20b are constituted. Then, it is determined that $Fe_2O_3$ has been generated in the outermost layer of the scale SC generated on the surface of the steel material SM if there is a difference between a measured value of the temperature of the steel material measured by the radiation thermometer 20a corresponding to the first wavelength (a first steel material temperature) and a measured value of the temperature of the steel material measured by the radiation thermometer 20b corresponding to the second wavelength (a second steel material temperature). In contrast to this, if there is no difference between the first steel material temperature and the second steel material temperature, it is possible to determine that the outermost layer of the scale SC is FeO and $Fe_2O_3$ has not been generated.

However, there are generated variations in measurement (there is tolerance, or the like) in an actual radiation thermometer, and therefore, there is sometimes a case that the first steel material temperature and the second steel material temperature do not coincide with each other completely even when the outermost layer of the scale SC is FeO. Accordingly, preferably, it is determined that $Fe_2O_3$ has been generated in the outermost layer of the scale SC generated on the surface of the steel material SM if the absolute value of the difference between the first steel material temperature and the second steel material temperature measured by the radiation thermometers 20a, 20b is equal to or more than a predetermined value, and it is determined that $Fe_2O_3$ has not been generated if the absolute value is not equal to or more than the predetermined value. In the case where the variations in temperature are ±10[° C.], for example, 20[° C.] can be employed as the absolute value of the difference between the first steel material temperature and the second steel material temperature.

Figure 5:
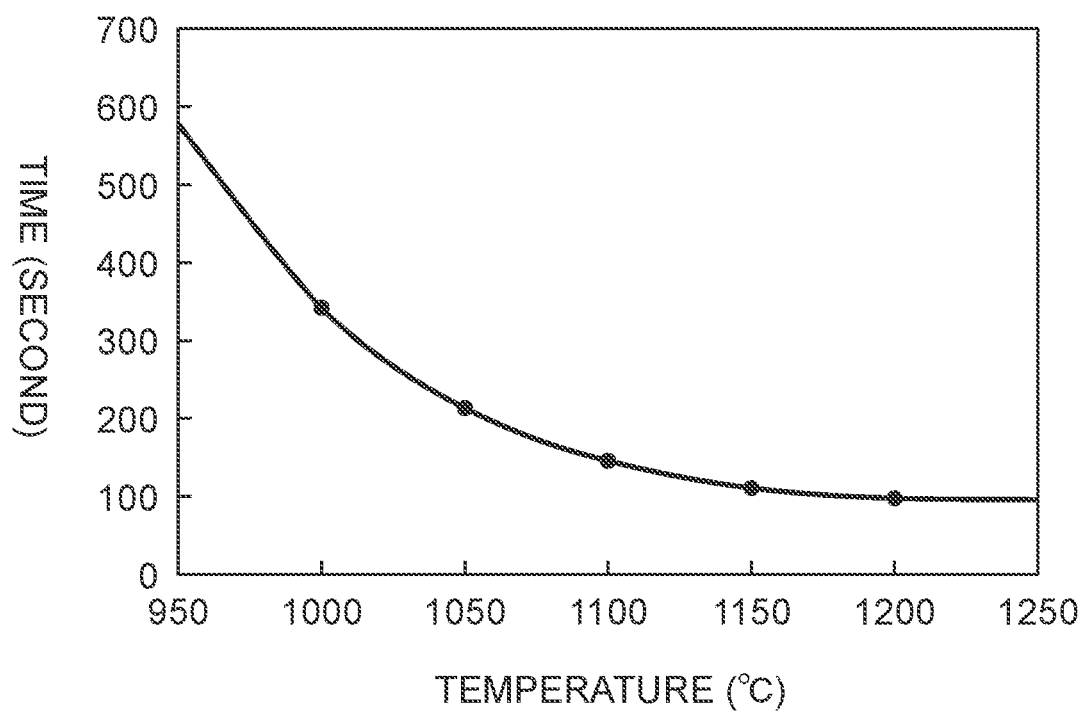
FIG. 5 is a view illustrating one example of the relationship between a time period for which $Fe_2O_3$ is generated and a temperature of the steel material.

FIG. 5 is a view illustrating one example of the relationship between a time period for which $Fe_2O_3$ is generated and a temperature of the steel material SM.

The temperature in FIG. 5 indicates the temperature of the steel material SM when being subjected to descaling. Here, each time period until the thickness of $Fe_2O_3$ in the outermost layer of the scale SC generated on the surface of the steel material SM becomes 1.5 [μm] after performing descaling when the temperature of the steel material SM when being subjected to descaling was each of 1000[° C.], 1050[° C.], 1100[° C.], 1150[° C.], and 1200[° C.] was derived. These values illustrate a plot illustrated in FIG. 5. Incidentally, the equation used for the derivation is described in Non-Patent Literature 1, so that its detailed explanation is omitted here. Further, the thickness of $Fe_2O_3$ was assumed as 1[%] of the thickness of the scale SC here.

When the time period until the thickness of $Fe_2O_3$ generated in the outermost layer of the scale SC after performing descaling becomes 1.5 [μ] is set to $t_B$ [second] and $t_B$ is approximated by a cubic formula, (1) Equation below is obtained. Here, $T_s$ represents the temperature of the steel material SM [° C.].

$$t_B = -2.978 \times 10^{-5} \times T_s^3 + 1.069 \times 10^{-1} \times T_s^2 - 1.281 \times 10^2 \times T_s + 5.128 \times 10^4 \quad (1)$$

As has been explained with reference to FIG. 4, if the estimated thickness of $Fe_2O_3$ is 1.5 [μm] or less, the wavelengths λ detected by the radiation thermometers 20a, 20b and the spectral emissivities set in the radiation thermometers 20a, 20b are determined as described previously, thereby making it possible to determine whether or not $Fe_2O_3$ has been generated in the outermost layer of the scale SC (see (a3) to (c3) described previously). Then, in an actual hot rolling process, as for a time interval when descaling is performed, descaling is often performed every time interval shorter than the time period $t_B$ indicated by (1) Equation. Accordingly, it is possible to apply the method of determining whether or not $Fe_2O_3$ has been generated in the outermost layer of the scale SC as described previously to a place where the time interval when descaling is performed is shorter than the time period $t_B$ indicated by (1) Equation in the hot rolling line.

However, the steel material SM while being conveyed on the downstream side from the finishing mill 15 is low in temperature, is subjected to continuous rolling, and is sprayed by cooling water, and thus the thickness of $Fe_2O_3$ generated in the outermost layer of the scale SC is up to 0.1 [μm]. Accordingly, it is possible to determine the place where the radiation thermometers 20a, 20b are arranged independently of the time period $t_B$ indicated by (1) Equation on the downstream side from the finishing mill 15.

<Scale Composition Determination Device 10>

Next, there will be explained one example of details of the scale composition determination device 10. Hardware of the scale composition determination device 10 can be fabricated by using an information processing device including a CPU, a ROM, a RAM, a HDD, and various interfaces or using dedicated hardware, for example.

Figure 6:
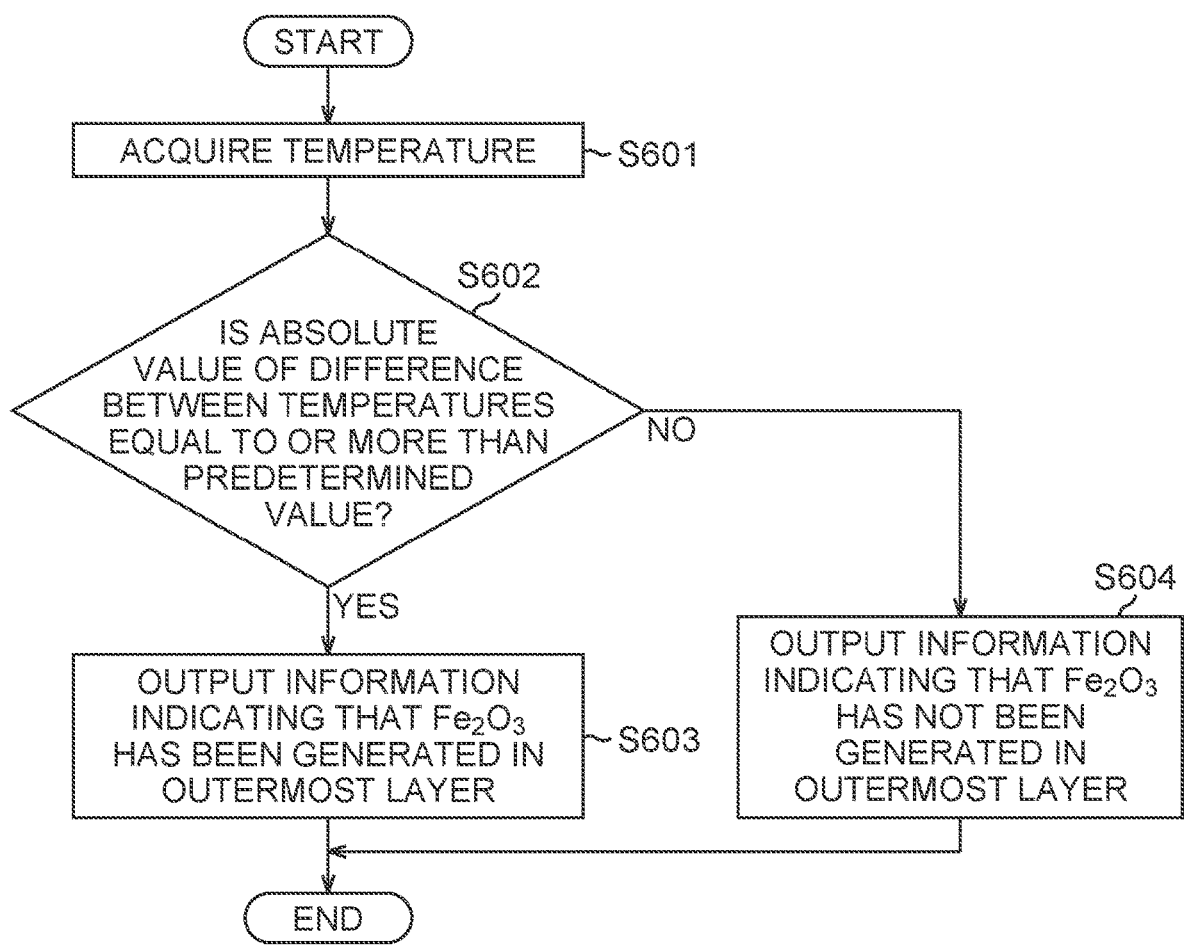
FIG. 6 is a flowchart explaining one example of an operation of a scale composition determination device.

FIG. 6 is a flowchart explaining one example of the operation of the scale composition determination device 10. There will be explained one example of the function of the scale composition determination device 10 with reference to FIG. 2 and FIG. 6. Incidentally, the flowchart in FIG. 6 is executed every time the temperature of the steel material SM is measured by the radiation thermometers 20a, 20b.

At Step S601, a temperature acquisition unit 201 acquires the temperatures of the steel material SM measured by the radiation thermometers 20a, 20b.

Next, at Step S602, a determination unit 202 determines whether or not the absolute value of a difference between the temperatures of the steel material SM acquired at Step S601 is equal to or more than a predetermined temperature. The predetermined temperature is set in the scale composition determination device 10 before starting execution of the flowchart in FIG. 6. Further, as described previously, in the case where the variations in temperature are ±10[° C.], for example, as the predetermined value, 20[° C.] can be employed.

As a result of this determination, in the case where the absolute value of the difference between the temperatures of the steel material SM is equal to or more than the predetermined temperature, it is determined that $Fe_2O_3$ has been generated in the outermost layer of the scale SC (namely, it is determined that the multilayer scale has been generated on the surface of the steel material SM). Then, at Step S603, an output unit 203 outputs information indicating that $Fe_2O_3$ has been generated in the outermost layer of the scale SC (the multilayer scale has been generated on the surface of the steel material SM). Then, the processing by the flowchart in FIG. 6 is finished.

On the other hand, in the case where the absolute value of the difference between the temperatures of the steel material SM is not equal to or more than the predetermined temperature, it is determined that $Fe_2O_3$ has not been generated in the outermost layer of the scale SC (namely, the single-layer scale has been generated on the surface of the steel material SM). Then, at Step S604, the output unit 203 outputs information indicating that $Fe_2O_3$ has not been generated in the outermost layer of the scale SC (the single-layer scale has been generated on the surface of the steel material SM). Then, the processing by the flowchart in FIG. 6 is finished.

Incidentally, as a mode of outputting the aforementioned information by the output unit 203, it is possible to employ at least one of displaying it on a computer display, transmitting it to an external device, and storing it in an internal or external storage medium of the scale composition determination device 10, for example.

Figure 7:
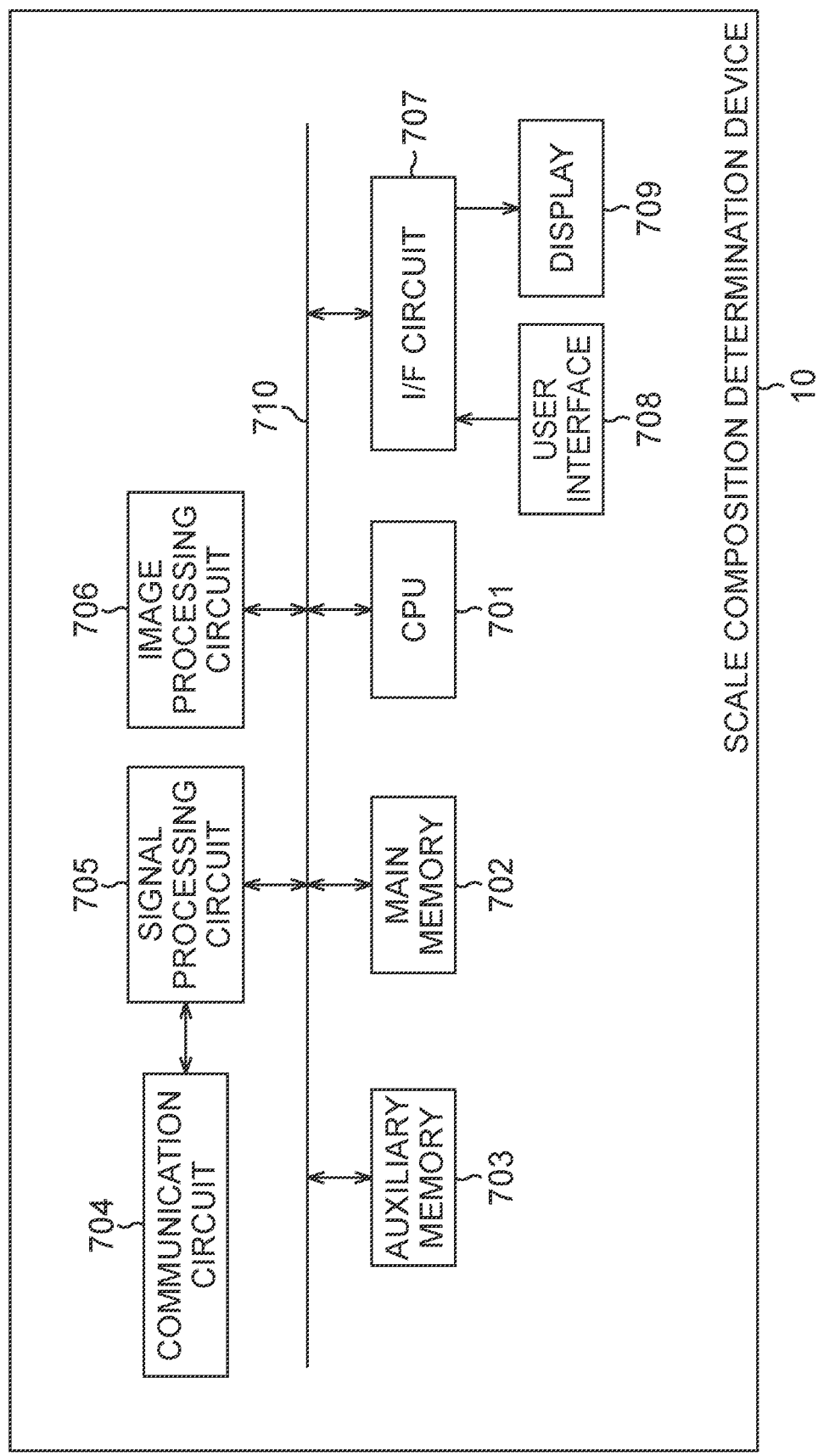
FIG. 7 is a diagram illustrating one example of a hardware configuration of the scale composition determination device.

FIG. 7 is a diagram illustrating one example of a configuration of the hardware of the scale composition determination device 10.

In FIG. 7, the scale composition determination device 10 includes a CPU 701, a main memory 702, an auxiliary memory 703, a communication circuit 704, a signal processing circuit 705, an image processing circuit 706, an I/F circuit 707, a user interface 708, a display 709, and a bus 710.

The CPU 701 integrally controls the whole of the scale composition determination device 10. The CPU 701 uses the main memory 702 as a work area to execute programs stored in the auxiliary memory 703. The main memory 702 stores data temporarily. The auxiliary memory 703 stores various pieces of data other than the programs to be executed by the CPU 701. The auxiliary memory 703 stores pieces of information necessary for the processing of the flowchart illustrated in FIG. 6, which are the previously described predetermined temperature, and so on.

The communication circuit 704 is a circuit for performing communication with the outside of the scale composition determination device 10.

The signal processing circuit 705 performs various pieces of signal processing on a signal received in the communication circuit 704 and a signal input in accordance with the control by the CPU 701. The temperature acquisition unit 201 exhibits its function by using the CPU 701, the communication circuit 704, and the signal processing circuit 705, for example. Further, the determination unit 202 exhibits its function by using the CPU 701 and the signal processing circuit 705, for example.

The image processing circuit 706 performs various pieces of image processing on a signal input in accordance with the control by the CPU 701. The image-processed signal is output to the display 709.

The user interface 708 is a part through which an operator gives an instruction to the scale composition determination device 10. The user interface 708 includes, for example, buttons, switches, dials, and so on. Further, the user interface 708 may have a graphical user interface using the display 709.

The display 709 displays an image based on a signal output from the image processing circuit 706. The I/F circuit 707 exchanges data with devices connected to the I/F circuit 707. In FIG. 7, as the device connected to the I/F circuit 707, the user interface 708 and the display 709 are illustrated. However, the device connected to the I/F circuit 707 is not limited to these. For example, a portable storage medium may be connected to the I/F circuit 707. Further, at least a part of the user interface 708 and the display 709 may be provided outside the scale composition determination device 10.

The output unit 203 exhibits its function by using at least one of a set of the communication circuit 704 and the signal processing circuit 705 and a set of the image processing circuit 706, the I/F circuit 707, and the display 709, for example.

Incidentally, the CPU 701, the main memory 702, the auxiliary memory 703, the signal processing circuit 705, the image processing circuit 706, and the I/F circuit 707 are connected to the bus 710. Communications between these components are performed through the bus 710. Further, the hardware of the scale composition determination device 10 is not limited to the one illustrated in FIG. 7 as long as the previously described functions of the scale composition determination device 10 can be achieved.

In this embodiment as above, the scale composition determination device 10 determines that $Fe_2O_3$ has been generated in the outermost layer of the scale SC in the case where the absolute value of the difference between the temperatures of the steel material SM measured by the radiation thermometers 20a, 20b is equal to or more than the predetermined temperature, and determines that $Fe_2O_3$ has not been generated in the outermost layer of the scale SC in the case where the absolute value of the difference between the temperatures measured by the radiation thermometers 20a, 20b is not equal to or more than the predetermined temperature. On this occasion, the hematite curves are found beforehand at the respective wavelengths λ selected from within the wavelength bands that are not affected by the gas in the atmosphere in the measurement by the radiation thermometers 20a, 20b. In this embodiment, the hematite curve is a curve indicating the relationship between the temperature of the steel material SM measured by the radiation thermometer in which the spectral emissivity of FeO is set (the temperature of $Fe_2O_3$) and the thickness of $Fe_2O_3$. Then, a set of the wavelengths λ such that the upper limit value of the thickness of $Fe_2O_3$ to be measured becomes less than the thickness of $Fe_2O_3$ at the intersection point of these curves is found. Then, the wavelengths λ detected by the radiation thermometers 20a, 20b and the spectral emissivities set in the radiation thermometers 20a, 20b are set to the found wavelengths λ and the spectral emissivities of FeO at the wavelengths λ respectively. Accordingly, performing two radiation temperature measurements makes it possible to accurately determine whether the scale SC generated on the surface of the steel material SM during operation is the single-layer scale or the multi-layer scale online. This makes it possible to perform operational management speedily and accurately and reflect a determination result of the composition of the scale SC in the operation speedily and accurately, for example.

MODIFIED EXAMPLE

Modified Example 1

In this embodiment, the case of using the two radiation thermometers 20a, 20b has been explained as an example. However, this embodiment does not necessarily need to be configured in this manner as long as it is designed to measure the temperature by the radiation thermometry at two different wavelengths. An optical part in a two-color thermometer may be used as a single radiation thermometer, for example. To be more specific, for example, light that has entered through the same light collecting lens is divided into two by a half mirror. Then, the divided light is made to pass through one of two wavelength selecting filters through which only lights with wavelengths different from each other pass. The temperature of the light that has passed through the wavelength selecting filter is measured by the radiation thermometry. In this manner, space saving of the radiation thermometers can be achieved.

Modified Example 2

In this embodiment, the case where a set of the radiation thermometers 20a, 20b is arranged in a region between the descaler 12b and the rolling stand 14b provided on the most upstream side out of the rolling stands having work rolls and backup rolls has been explained as an example. However, the place where a set of the radiation thermometers is arranged is not limited to this place as long as it is a place on the downstream side from the descaler 12a on the most upstream side in the hot rolling process (the temperature of the steel sheet that has been extracted from the heating furnace 11 to be subjected to descaling at least one time is measured). It is possible to arrange a set of radiometers in a place between a descaler and a rolling stand located closest to the descaler on the downstream side, for example. Further, each set of radiation thermometers may be arranged at a plurality of locations in such a place (that is, a plurality of sets of radiation thermometers may be arranged). In this case, the scale composition determination device 10 performs the processing by the flowchart illustrated in FIG. 6 using each of the sets of radiation thermometers and determines whether or not $Fe_2O_3$ has been generated in the outermost layer of the scale SC in each place where the set of radiation thermometers is arranged.

Modified Example 3

In this embodiment, the case where the spectral emissivities of FeO corresponding to the wavelengths λ detected by the radiation thermometers 20a, 20b are set as the spectral emissivities set in the radiation thermometers 20a, 20b has been explained as an example. However, this embodiment does not necessarily need to be configured in this manner. For example, as the spectral emissivities for the radiation thermometers 20a, 20b, the same value may be set regardless of the wavelength λ (for example, the value may be set to 0.78 at any wavelength λ or set to an initial set value). In this case, spectral emissivities different from the original spectral emissivities of FeO are set in the radiation thermometers 20a, 20b. Accordingly, the temperatures to be measured by the radiation thermometers 20a, 20b also vary accordingly. Thus, in consideration of this variation in the temperature, the size of the predetermined value to be used for making a comparison with the absolute value of the difference between the temperatures measured by the radiation thermometers 20a, 20b is determined.

Modified Example 4

In this embodiment, the case where the scale composition determination device 10 is applied to the hot rolling line for a thin sheet has been explained as an example. However, the application destination of the scale composition determination device 10 is not limited to the hot rolling line for a thin sheet. In this case, the contents of the previously described wavelength bands defined in (a1) to (c1) result in the contents corresponding to the application destination of the scale composition determination device 10. Further, the previously described contents defined in (a3) to (c3) such as the thickness of $Fe_2O_3$ also result in the contents corresponding to the application destination of the scale composition determination device 10. However, in this case as well, two wavelengths λ such that the thickness of $Fe_2O_3$ at the intersection point of two curves such as the curves 401 and 403 illustrated in FIG. 4 indicating the relationship between the temperatures of the steel material SM obtained by the radiation thermometry at two wavelengths λ different from each other (the temperature of $Fe_2O_3$) and the thickness of $Fe_2O_3$ exceeds the upper limit value of the thickness of $Fe_2O_3$ to be measured are set to the wavelengths λ to be detected by the radiation thermometers 20a, 20b. As another application destination of the scale composition determination device 10, for example, the heating furnace described in Patent Literature 1 is cited.

Modified Example 5

In this embodiment, the case of measuring the temperature by the radiation thermometers 20a, 20b has been explained as an example. However, the temperatures do not necessarily need to be further measured by the radiation thermometers 20a, 20b. For example, spectral radiances may be detected by radiometers to measure (derive) the temperatures in the scale composition determination device 10 based on the detected spectral radiances. Unless there is a risk of damage in a thermometer, a contact-type thermometer may be used.

Second Embodiment

Next, there will be explained a second embodiment. In the first embodiment, the case of using the two radiation thermometers 20a, 20b has been explained as an example. In contrast to this, in this embodiment, the case of using three or more radiation thermometers will be explained. As above, this embodiment and the first embodiment are mainly different in the number of radiation thermometers and a part of the processing of the scale composition determination device 10, which is due to the number of radiation thermometers being different. Thus, in the explanation of this embodiment, the same reference numerals and symbols as those added to FIG. 1 to FIG. 7 are added to the same parts as those in the first embodiment, and the like, and therefore their detailed explanations are omitted.

Figure 8:
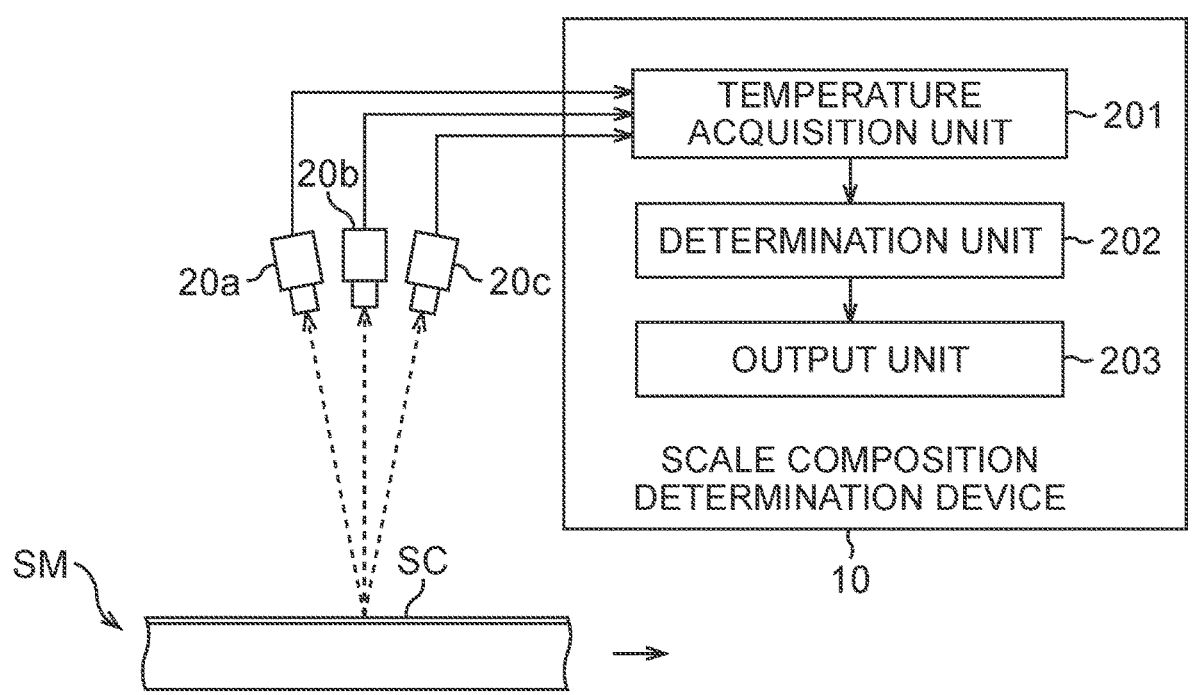
FIG. 8 is a view illustrating a second example of the configuration of the scale composition determination system.

FIG. 8 is a view illustrating one example of a configuration of a scale composition determination system. In FIG. 8, examples of the arrangement of radiation thermometers 20a, 20b, and 20c and a functional configuration of the scale composition determination device 10 are illustrated. FIG. 8 is a view corresponding to FIG. 2.

<Radiation Thermometers 20a, 20b, and 20c>

First, there will be explained one example of the arrangement of the radiation thermometers 20a, 20b, and 20c. In FIG. 8, the radiation thermometers 20a, 20b, and 20c are arranged so that intersection points between (the surface of) the steel material SM and passing positions of axes of the radiation thermometers 20a, 20b, and 20c (optical axes of light collecting lenses) substantially coincide. Incidentally, in FIG. 8, the case where the radiation thermometers 20a, 20b, and 20c are aligned in the conveying direction of the steel material SM is illustrated as an example. However, the radiation thermometers 20a, 20b, and 20c do not need to be arranged in this manner as long as the intersection points between (the surface of) the steel material SM and the passing positions of the axes of the radiation thermometers 20a, 20b, and 20c (the optical axes of the light collecting lenses) substantially coincide. For example, the radiation thermometers 20a, 20b, and 20c may be aligned in the width direction of the steel material SM.

Next, there will be explained one example of wavelengths to be detected in the radiation thermometers 20a, 20b, and 20c.

The radiation thermometer 20a is a radiation thermometer to set the wavelength λ selected from within the wavelength band of (a1) explained in the first embodiment to a wavelength for a measurement object. The radiation thermometer 20b is a radiation thermometer to set the wavelength λ selected from within the wavelength band of (b1) explained in the first embodiment to a wavelength for a measurement object. The radiation thermometer 20c is a radiation thermometer to set the wavelength λ selected from within the wavelength band of (c1) explained in the first embodiment to a wavelength for a measurement object.

Further, spectral emissivities $\varepsilon_w$ of FeO according to the wavelengths λ are set in the radiation thermometers 20a, 20b, and 20c.

Using the above radiation thermometers 20a, 20b, and 20c makes it possible to obtain the hematite curves 401, 402, and 403 in FIG. 4 as one example of the relationship between the temperature of the steel material SM having a multilayer scale on the surface and the thickness of $Fe_2O_3$ in the outermost layer of this multilayer scale.

In the example illustrated in FIG. 4, as long as the thickness of $Fe_2O_3$ in the outermost layer of the multilayer scale is 1.5 [μm] or less, the intersection point where the curves 401, 402, and 403 all intersect is not present. Accordingly, in at least one combination of a plurality of combinations of two temperatures out of temperatures measured by the radiation thermometers 20a, 20b, and 20c, a difference between the temperatures is generated. Therefore, it is possible to determine that $Fe_2O_3$ is present in the outermost layer of the scale SC in the case where in at least one combination of a plurality of combinations of two temperatures out of the temperatures measured by radiation thermometers 20a, 20b, and 20c, there is a difference between the temperatures, and it is possible to determine that $Fe_2O_3$ is not present in the case where there is no difference in all combinations. Doing this makes it possible to expand a range of the estimated thickness of $Fe_2O_3$ to be determined. Further, it becomes unnecessary to exchange a radiation thermometer according to the estimated thickness of $Fe_2O_3$.

As has been explained in the first embodiment, however, there are generated variations in measurement (there is tolerance, or the like) in an actual radiation thermometer. Accordingly, preferably, it is determined that $Fe_2O_3$ has been generated in the outermost layer of the scale SC generated on the surface of the steel material SM if in at least one combination of a plurality of combinations of two temperatures out of the temperatures measured by radiation thermometers 20a, 20b, and 20c, the absolute value of the difference between the temperatures is equal to or more than a predetermined value, and it is determined that $Fe_2O_3$ has not been generated if the absolute value of the difference between the temperatures is not equal to or more than the predetermined value. In the case of the variations in temperature being ±10[° C.], for example, 20[° C.] can be employed as the predetermined value.

Further, the place where the radiation thermometers 20a, 20b, and 20c are arranged is the same as that explained in the first embodiment.

<Scale Composition Determination Device 10>

The configuration of the scale composition determination device 10 is the same as that of the scale composition determination device 10 in the first embodiment. There will be explained one example of the function of the scale composition determination device 10 in this embodiment with reference to the flowchart in FIG. 6. Incidentally, the processing in the flowchart in FIG. 6 is executed every time the temperature of the steel material SM is measured by the radiation thermometers 20a, 20b, and 20c.

At Step S601, the temperature acquisition unit 201 acquires the temperatures of the steel material SM measured by the radiation thermometers 20a, 20b, and 20c.

Next, at Step S602, the determination unit 202 determines whether or not in at least one combination of a plurality of combinations of two temperatures out of the temperatures of the steel material SM acquired at Step S601, the absolute value of a difference between the temperatures is equal to or more than a predetermined temperature.

As a result of this determination, in the case where the absolute value of the difference between the temperatures in at least one combination of a plurality of the combinations of two temperatures out of the temperatures of the steel material SM acquired at Step S601 is equal to or more than the predetermined temperature, it is determined that $Fe_2O_3$ has been generated in the outermost layer of the scale SC (namely, it is determined that the multilayer scale has been generated on the surface of the steel material SM). Then, at Step S603, the output unit 203 outputs information indicating that $Fe_2O_3$ has been generated in the outermost layer of the scale SC (the multilayer scale has been generated on the surface of the steel material SM). Then, the processing by the flowchart in FIG. 6 is finished.

On the other hand, in the case where the absolute value of the difference between the temperatures in at least one combination of a plurality of the combinations of two temperatures out of the temperatures of the steel material SM acquired at Step S601 is not equal to or more than the predetermined temperature, it is determined that $Fe_2O_3$ has not been generated in the outermost layer of the scale SC (namely, it is determined that the single-layer scale has been generated on the surface of the steel material SM). Then, at Step S604, the output unit 203 outputs information indicating that $Fe_2O_3$ has not been generated in the outermost layer of the scale SC (the single-layer scale has been generated on the surface of the steel material SM). Then, the processing by the flowchart in FIG. 6 is finished.

In the example illustrated in FIG. 4, the intersection point where the curves 401, 402, and 403 all intersect is not present. However, depending on the application destination of the scale composition determination device 10, for example, the intersection point where the three curves, which indicate the relationship between the temperature of the steel material SM and the thickness of $Fe_2O_3$ in the outermost layer of the multilayer scale, intersect can be generated. Accordingly, in the same manner as in the first embodiment, it is confirmed beforehand that such an intersection point is not generated. The following is performed concretely.

The wavelength λ selected from within the wavelength band of (a1) is set to a wavelength for measurement in the radiation thermometer 20a. Further, the spectral emissivity of FeO corresponding to this wavelength λ is set in the radiation thermometer 20a. The wavelength λ selected from within the wavelength band of (b1) is set to a wavelength for measurement in the radiation thermometer 20b. Further, the spectral emissivity of FeO corresponding to this wavelength λ is set in the radiation thermometer 20b. The wavelength λ selected from within the wavelength band of (c1) is set to a wavelength for measurement in the radiation thermometer 20c. Further, the spectral emissivity of FeO corresponding to this wavelength λ is set in the radiation thermometer 20c.

Hematite curves indicating the relationship between the temperatures of the steel material SM measured by the above radiation thermometers 20a, 20b, and 20c (the temperature of $Fe_2O_3$) and the estimated thickness of $Fe_2O_3$ are created. Then, it is determined whether or not there is an intersection point where the three hematite curves intersect within a range of the estimated thickness of $Fe_2O_3$. In the case where the intersection point where the three hematite curves intersect is present, at least one of the wavelengths for measurement in the radiation thermometers 20a, 20b, and 20c is changed. Then, similarly to the above, it is determined whether or not there is an intersection point where the three hematite curves intersect within a range of the estimated thickness of $Fe_2O_3$. The above processes are performed until the intersection point where the three hematite curves intersect becomes no longer present within a range of the estimated thickness of $Fe_2O_3$. Then, in the case where the intersection point where the three hematite curves intersect is not present within a range of the estimated thickness of $Fe_2O_3$, the wavelengths for measurement of the radiation thermometers 20a, 20b, and 20c used when creating these three hematite curves are employed.

In this embodiment as above, the scale composition determination device 10 determines that $Fe_2O_3$ has been generated in the outermost layer of the scale SC in the case where the absolute value of the difference between the temperatures in at least one combination of a plurality of the combinations of two temperatures out of the temperatures of the steel material SM measured by the radiation thermometers 20a, 20b, and 20c is equal to or more than the predetermined temperature, and determines that $Fe_2O_3$ has not been generated in the outermost layer of the scale SC in the case where the absolute value of the difference between the temperatures in at least one combination of a plurality of the combinations of two temperatures out of the temperatures of the steel material SM measured by the radiation thermometers 20a, 20b, and 20c is not equal to or more than the predetermined temperature. Accordingly, it is possible to obtain the following effects in addition to the effects explained in the first embodiment. That is, it is possible to expand the range of the estimated thickness of $Fe_2O_3$ to be determined. Moreover, it becomes unnecessary to exchange a radiation thermometer according to the assumed estimated thickness of $Fe_2O_3$.

In the first embodiment, the number of radiation thermometers is two. In contrast to this, in this embodiment, the number of radiation thermometers is three. Therefore, the first embodiment makes it possible to configure the system more inexpensively than the second embodiment. Furthermore, the first embodiment makes it possible to make the space where the radiation thermometers are arranged more compact than the second embodiment. On the other hand, in the second embodiment, it is possible to securely determine whether or not $Fe_2O_3$ is present in the outermost layer of the scale SC even in the case where the assumed estimated thickness of $Fe_2O_3$ is changed. In consideration of the above points, for example, it is possible to determine which to employ between the first embodiment and the second embodiment.

MODIFIED EXAMPLES

Modified Example 6

In this embodiment, the case where the number of wavelengths $\lambda$ to be detected by the radiation thermometers is three has been explained as an example. However, the number of wavelengths $\lambda$ to be detected by the radiation thermometers only needs to be three or more. For example, from within two or more wavelength bands out of the wavelength bands of (a1), (b1), and (c1) explained in the first embodiment, the wavelengths $\lambda$ to be detected by the radiation thermometers may be selected. However, at this time, three or more wavelengths in total are selected. As above, the wavelengths $\lambda$ do not need to be selected from all the wavelength bands of (a1), (b1), and (c1).

Further, even when the number of wavelengths $\lambda$ to be detected by the radiation thermometers is two, the technique of this embodiment can be employed. In this case, the wavelengths $\lambda$ to be detected by two radiation thermometers are selected so as to prevent intersection points where two curves indicating the relationship between the temperatures of the steel material SM measured by the two radiation thermometers (the temperature of $Fe_2O_3$) and the thickness of $Fe_2O_3$ all intersect from being present. In the example illustrated in FIG. 4, selecting the hematite curves 401 and 403 corresponds to this. For example, as the wavelengths $\lambda$ to be detected by the radiation thermometers, two wavelengths in total may be selected from within two wavelength bands out of the wavelength bands of (a1), (b1), and (c1).

From the above, in the case of using the wavelength bands of (a1), (b1), and (c1), the wavelengths $\lambda$ to be detected by the radiation thermometers result in wavelengths in two or more wavelength bands out of the wavelength bands of (a1), (b1), and (c1).

When the above is generalized, the wavelengths $\lambda$ to be detected by N pieces of radiation thermometers are selected so as to prevent intersection points where N pieces of hematite curves indicating the relationship between the temperatures of the steel material SM measured by N pieces of radiation thermometers (the temperature of $Fe_2O_3$) and the thickness of $Fe_2O_3$ all intersect from being present within the range of the estimated thickness of $Fe_2O_3$.

Concretely, N pieces of wavelengths are set to a first wavelength to an Nth wavelength, and each one wavelength selected from the first wavelength to the Nth wavelength is set to an nth wavelength (as the nth wavelength, each one of the first wavelength to the Nth wavelength is selected in order). Then, the aforementioned hematite curve at the nth wavelength results in a curve indicating the relationship between the thickness of hematite and the temperature of hematite obtained by radiation thermometry at this nth wavelength with the spectral emissivity set to the spectral emissivity of wustite (FeO). Here, the first wavelength to the Nth wavelength are determined so as to prevent intersection points where the hematite curves at the first wavelength to the Nth wavelength all intersect from being present within the range of the assumed thickness of hematite ($Fe_2O_3$). Then, the spectral emissivity is set to the spectral emissivity of wustite at this nth wavelength and then the temperature of the aforementioned steel material at this nth wavelength is measured by radiation thermometry. Such a measurement is performed at each of the first wavelength to the Nth wavelength.

In the above explanation, N is preferred to be an integer of three or more, but may be an integer of two or more.

Modified Example 7

In this embodiment as well, the modified examples explained in the first embodiment can be employed.

Other Modified Examples

Incidentally, the above-explained embodiments of the present invention can be implemented by causing a computer to execute a program. Further, a computer-readable recording medium in which the aforementioned program is recorded and a computer program product such as the aforementioned program are also applicable as the embodiment of the present invention. As the recording medium, for example, a flexible disk, a hard disk, an optical disk, a magnetic optical disk, a CD-ROM, a magnetic tape, a nonvolatile memory card, a ROM, or the like can be used.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

INDUSTRIAL APPLICABILITY

The present invention can be utilized for manufacturing a steel material, and so on.

The invention claimed is:

1. A scale composition determination system that determines a composition of a scale generated on a surface of a steel material, the scale composition determination system comprising:
   a computer processor including processing circuitry; and
   at least one of radiation thermometers, each of the at least one of radiation thermometers, including a respective light collecting lens that measures temperatures of the steel material at N pieces of wavelengths different from one another by radiation thermometry; wherein
   the computer processor determines whether or not hematite ($Fe_2O_3$) has been generated in an outermost layer of the scale based on a difference between two temperatures out of the temperatures of the steel material measured by the at least one of radiation thermometers, wherein N pieces of the wavelengths are determined so as to prevent an intersection point where hematite curves at N pieces of the wavelengths all intersect from being present within a range of an assumed thickness of hematite ($Fe_2O_3$), the hematite curves are curves indicating the relationship between a thickness of hematite and a temperature of hematite, and N is an integer of three or more.

2. The scale composition determination system according to claim 1, wherein

N pieces of the wavelengths are a first wavelength to an Nth wavelength, each one wavelength selected from the first wavelength to the Nth wavelength is set to an nth wavelength, a hematite curve at the nth wavelength is a curve indicating the relationship between a thickness of hematite and a temperature of hematite at the nth wavelength obtained by radiation thermometry with spectral emissivity set to spectral emissivity of wustite (FeO), the at least one of radiation thermometers measures a temperature of the steel material at the nth wavelength by radiation thermometry with spectral emissivity set to spectral emissivity of wustite at the nth wavelength, and the first wavelength to the Nth wavelength are determined so as to prevent an intersection point where hematite curves at the first wavelength to the Nth wavelength all intersect from being present within a range of an assumed thickness of hematite ($Fe_2O_3$).

3. The scale composition determination system according to claim 1, wherein the computer processor determines that hematite has been generated in the outermost layer of the scale in the case where in at least one combination of combinations of two temperatures out of the temperatures of the steel material measured by the at least one of radiation thermometers, an absolute value of a difference between the temperatures is equal to or more than a predetermined value, and determines that hematite has not been generated in the outermost layer of the scale in the case where in at least one combination of combinations of two temperatures out of the temperatures of the steel material measured by the at least one of radiation thermometers, the absolute value of the difference between the temperatures is not equal to or more than the predetermined value.

4. The scale composition determination system according to claim 1, wherein the steel material being an object for measuring the temperature is a steel material obtained after being extracted in a heating furnace in a hot rolling process and being subjected to descaling at least one time.

5. The scale composition determination system according to claim 4, wherein

N pieces of the wavelengths are wavelengths in any two or more ranges out of a wavelength in a range of 0.6 [μm] to 1.6 [μm], a wavelength in a range of 3.3 [μm] to 5.0 [μm], and a wavelength in a range of 8.0 [μm] to 14.0 [μm].

6. The scale composition determination system according to claim 1, wherein each of the at least one of radiation thermometers includes: a light collecting lens; a dividing mirror that divides light that has entered through the light collecting lens into N pieces of lights; and an extracting filter that extracts lights at N pieces of the wavelengths from the light divided by the dividing mirror, and temperatures of the steel material at N pieces of the wavelengths extracted by the extracting filter are measured by radiation thermometry.

7. A scale composition determination method that determines a composition of a scale generated on a surface of a steel material, the scale composition determination method comprising:

a measurement step of measuring temperatures of the steel material at N pieces of wavelengths different from one another by radiation thermometry; and a determination step of determining whether or not hematite ($Fe_2O_3$) has been generated in an outermost layer of the scale based on a difference between two temperatures out of the temperatures of the steel material measured by the measurement step, wherein N pieces of the wavelengths are determined so as to prevent an intersection point where hematite curves at N pieces of the wavelengths all intersect from being present within a range of an assumed thickness of hematite ($Fe_2O_3$), the hematite curves are curves indicating the relationship between a thickness of hematite and a temperature of hematite, and N is an integer of three or more.

8. A non-transitory computer-readable storage medium recording a program, executable by a computer processor including processing circuitry, for causing a computer to execute determination of a composition of a scale generated on a surface of a steel material, the program causing a computer to execute:

an acquisition step of acquiring temperatures of the steel material at N pieces of wavelengths different from one another, the temperatures measured by radiation thermometry; and a determination step of determining whether or not hematite ($Fe_2O_3$) has been generated in an outermost layer of the scale based on a difference between two temperatures out of the temperatures of the steel material acquired by the acquisition step, wherein N pieces of the wavelengths are determined so as to prevent an intersection point where hematite curves at N pieces of the wavelengths all intersect from being present within a range of an assumed thickness of hematite ($Fe_2O_3$), the hematite curves are curves indicating the relationship between a thickness of hematite and a temperature of hematite, and N is an integer of three or more.

* * * * *

UNITED STATES PATENT AND TRADEMARK OFFICE
CERTIFICATE OF CORRECTION

PATENT NO. : 11,454,542 B2
APPLICATION NO. : 17/243875
DATED : September 27, 2022
INVENTOR(S) : Hiroshi Tanei et al.

Page 1 of 1

It is certified that error appears in the above-identified patent and that said Letters Patent is hereby corrected as shown below:

On the Title Page

Please include the following Foreign Application Priority Data:
--(30) Foreign Application Priority Data
April 25, 2017 (JP)..................... 2017-086161--.

Signed and Sealed this
Third Day of January, 2023

Katherine Kelly Vidal
*Director of the United States Patent and Trademark Office*